United States Patent [19]

Thum

[11] Patent Number: 5,293,973
[45] Date of Patent: Mar. 15, 1994

[54] DEFORMATION MEMBER HAVING AN EVERSION PORTION

[75] Inventor: Holger M. Thum, Braunschweig, Fed. Rep. of Germany

[73] Assignee: Volkswagen AG, Wolfsburg, Fed. Rep. of Germany

[21] Appl. No.: 985,590

[22] Filed: Dec. 3, 1992

[30] Foreign Application Priority Data

Dec. 16, 1991 [DE] Fed. Rep. of Germany ....... 4141433

[51] Int. Cl.$^5$ ............................................. F16F 7/12
[52] U.S. Cl. .................................. 188/377; 280/777; 293/133
[58] Field of Search ............. 188/371, 377; 267/140; 293/132, 133, 135, 136; 280/777

[56] References Cited

U.S. PATENT DOCUMENTS

| | | | |
|---|---|---|---|
| 3,146,014 | 8/1964 | Kroell | 293/133 |
| 3,235,244 | 2/1966 | Hein | 293/136 X |
| 3,298,465 | 1/1967 | Stastny | 188/377 |
| 3,540,304 | 11/1970 | Weiss | 280/777 X |
| 3,795,418 | 3/1974 | Barenyi et al. | 293/136 |
| 3,869,165 | 3/1975 | Miller | 267/140 X |
| 4,050,726 | 9/1977 | Hablitzel | 188/371 X |
| 4,319,539 | 3/1982 | Fuji et al. | 293/136 X |
| 5,054,414 | 10/1991 | Yamaguchi | 267/140 X |

FOREIGN PATENT DOCUMENTS

| | | | |
|---|---|---|---|
| 1172558 | 1/1965 | Fed. Rep. of Germany | 293/133 |
| 252831 | 12/1985 | Japan | 267/140 |

*Primary Examiner*—Robert J. Oberleitner
*Assistant Examiner*—Kevin D. Rutherford
*Attorney, Agent, or Firm*—Brumbaugh, Graves, Donohue & Raymond

[57] ABSTRACT

A deformation member having an eversion portion includes a central deformation portion made of unreinforced thermoplastic synthetic material and end portions made of fiber-reinforced synthetic material providing connections to neighboring parts. This permits simple manufacture by injection molding.

7 Claims, 2 Drawing Sheets

DEFORMATION MEMBER HAVING AN EVERSION PORTION

BACKGROUND OF THE INVENTION

This invention relates to deformation members in which the length of the member may be reduced by eversion of a portion of the member.

As disclosed in German Patent No. 1 172 558, deformation members operating on the eversion principle may be employed in motor vehicles to provide, for example, an energy-converting connection between the bumper and the chassis of a vehicle, or as a telescoping connecting member between the steering wheel and the steering column or the hub of a steering wheel. Conventional deformation members of this type, providing energy conversion by eversive deformation, are fabricated of metal. As a rule, they require several manufacturing steps and are therefore costly to produce.

SUMMARY OF THE INVENTION

Accordingly, it is an object of the present invention to provide a deformation member having an eversion portion which overcomes the disadvantages of the prior art.

Another object of the invention is to provide a deformation member which is simple to manufacture but assures an effective conversion of kinetic energy into deformation energy with a stress-strain diagram which is adaptable to the particular application.

These and other objects of the invention are attained by providing a deformation member having end portions made of fiber-reinforced thermoplastic synthetic material and a central tubular eversion deformation portion made of unreinforced synthetic plastic material.

By using material-specific synthetics such as polyethylene, the invention permits economical manufacture of deformation members by applying the known art of injection molding. In one form of the invention, stiffening ribs disposed in a substantially radial arrangement provide a steep rise in the stress-strain diagram, representing an effective conversion of kinetic energy into deformation work.

By simple measures, elastic fastenings can be provided in the end portion of the deformation member for attachment to neighboring parts. However, the deformation member may also be fastened in other ways, for example, by screw connections.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

In the typical embodiment described hereinafter by way of example, a rotationally symmetrical deformation member engaging a rotationally symmetrical rigid body is assumed, but it will be understood that other cross-sectional shapes are not excluded.

Figure 3:
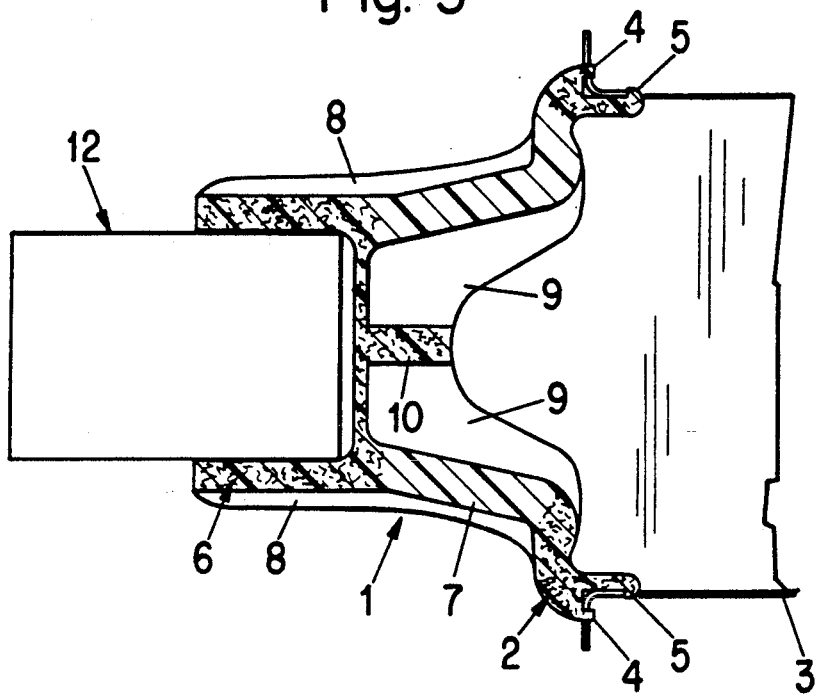
FIGS. 3 and 4 are views similar to FIG. 1 schematically illustrating automobile parts to which the deformation member of FIG. 1 is connected.
Figure 4:
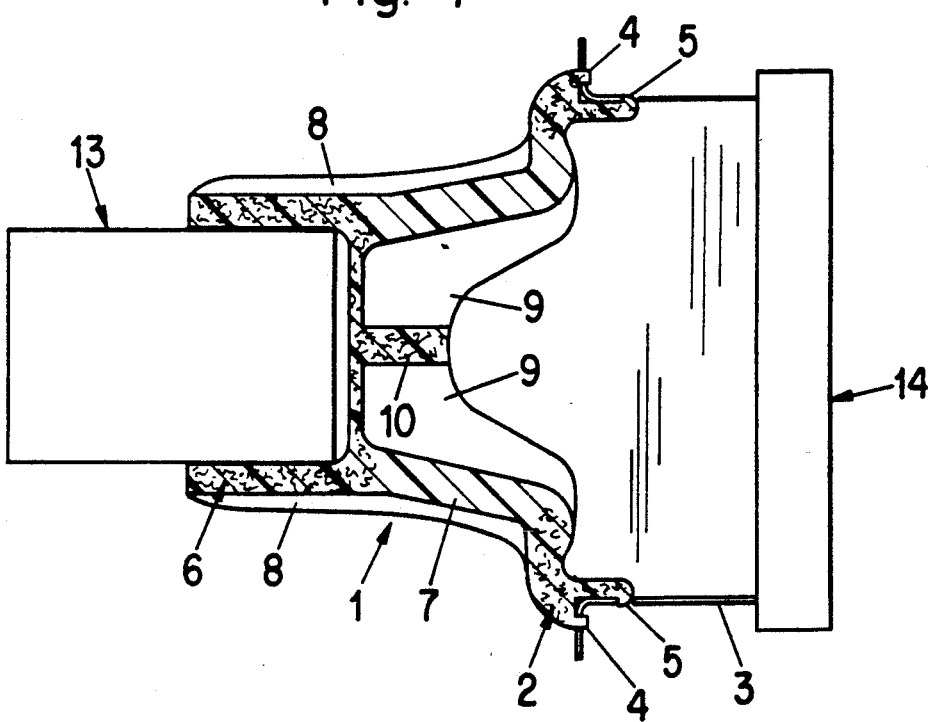

The typical deformation member 1 shown in the drawings is made of a thermoplastic synthetic material. It has a flange portion 2 arranged to be affixed to a rigid tubular body 3 by elastic projections 4 and 5 which snap into apertures in the body 3. The deformation member also has a projecting portion 6 at the other end which is arranged to be affixed to another part received therein as shown schematically in FIGS. 3 and 4. The flange portion 2 and the projecting portion 6 at opposite ends are made of fiber-reinforced plastic, while the intervening deformation portion 7 is made of unreinforced elastic plastic material.

Figure 1:
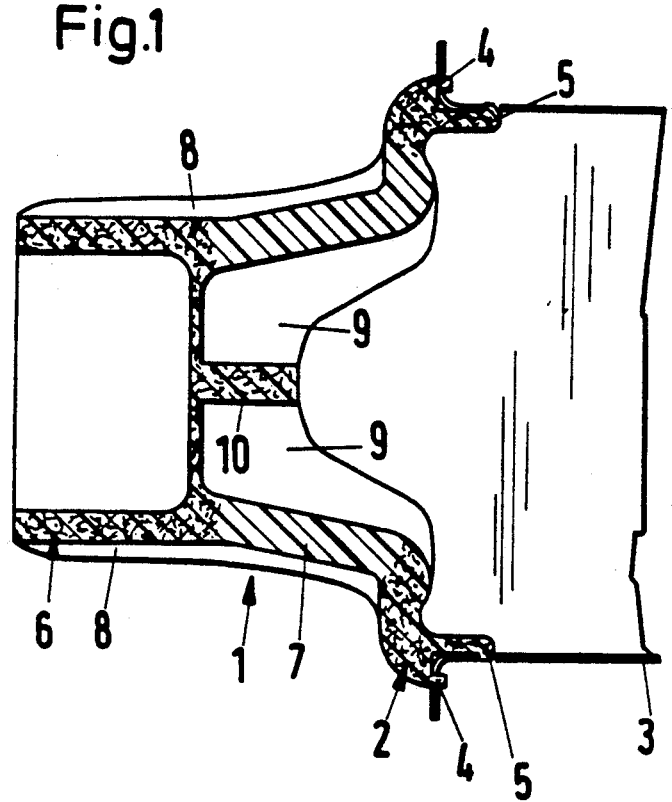
FIG. 1 is a view in longitudinal section showing a representative deformation member according to the invention in an undeformed state.
Figure 2:
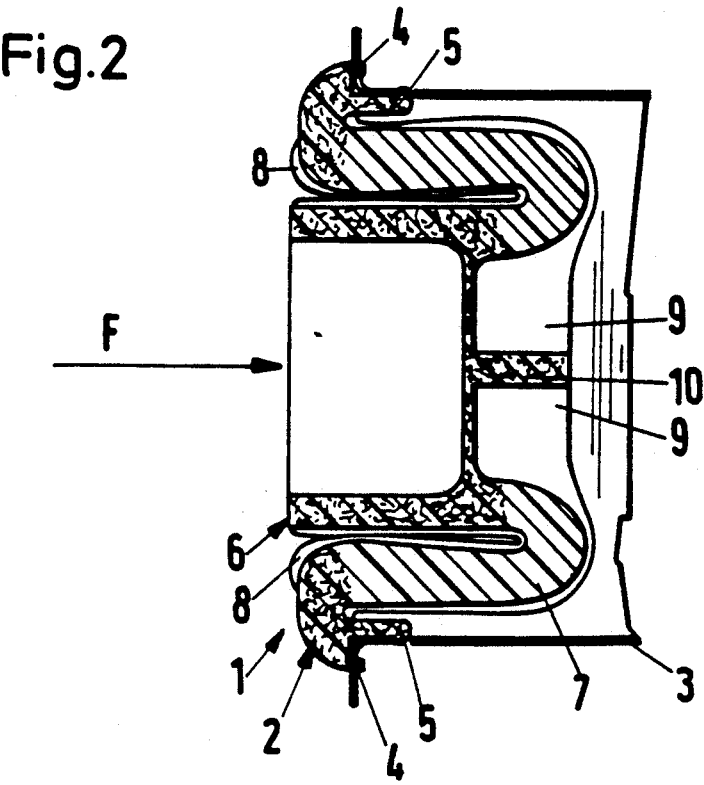
FIG. 2 is a view in longitudinal section showing the deformation member of FIG. 1 in the deformed state.

To stiffen the deformation portion 7 so as to control the conversion of energy by deformation, the deformation member is provided with a series of outer ribs 8 projecting substantially radially outwardly and inner ribs 9 forming transverse partitions. As shown in FIG. 2, the outer ribs 8 and the inner ribs 9 are deformed, although in different ways, upon deformation of the deformation portion 7 of the deformation member 1. In response to an applied force F, the outer ribs 8 are folded over, as are the outer ends of the inner ribs 9, and the inner portions of the ribs 9 are stressed in tension on either side of the web 10. If the applied force F is small, the tensile stresses in the ribs 8 and 9 deform them elastically so as to permit resilient restoration of the member 1 to the undeformed condition. When this occurs, the ribs 8, which are folded during deformation as shown in FIG. 2, and the corresponding portions of the inner ribs 9 return to their original shape, thus restoring the original initial rigidity of the member 1.

It will be understood that the deformation member 1 may be adapted to any particular application. For example, a snap connection to an adjacent part, such as a bumper 12, illustrated schmatically in FIG. 3, or a steering column 13, illustrated schematically in FIG. 4 may be provided in the end region 6 as well as in the end region 5. In this case, the body 3 shown in FIG. 3 constitutes a longitudinal chassis member and in FIG. 4 constitutes a component of a schematically illustrated steering wheel 14.

The invention thus provides a deformation member which, while of simple manufacture, provides a defined conversion of kinetic energy into elastic and plastic deformation work and which will spontaneously resume its initial shape after a limited deformation.

Although the invention has been described herein with reference to specific embodiments, many modifications and variations therein will readily occur to those skilled in the art. Accordingly, all such variations and modifications are included within the intended scope of the invention.

I claim:

1. A deformation member comprising a one-piece member having an outwardly projecting end portion made of fiber-reinforced synthetic thermoplastic material arranged for attachment to one end of an adjacent rigid tubular part, another end portion made of fiber-reinforced synthetic thermoplastic material at the other end arranged for attachment to another adjacent part, and a tubular deformation portion joining the end portions made of unreinforced synthetic thermoplastic material and arranged to reduce its length by eversion into the adjacent tubular part in response to a force of selected intensity directed essentially along the lengthwise axis of the member.

2. A deformation member according to claim 1 comprising a synthetic material having the properties of polyethylene.

3. A deformation member according to claim 1 including a plurality of stiffening ribs formed on the outside of the member arranged to be folded during eversion of the deformation portion.

4. A deformation member according to claim 1 including a plurality of partition-like ribs in the deformation portion arranged to be stressed in tension during eversion of the deformation portion.

5. A deformation member according to claim 1 wherein at least one of the end portions is configured to make a snap connection with one of the adjacent parts.

6. A deformation member according to claim 1 forming a connection between a steering wheel and a steering column of an automobile.

7. A deformation member according to claim 1 forming a connection between a bumper and a chassis of an automobile.

* * * * *